United States Patent [19]

Katakura et al.

[11] Patent Number: 5,241,229
[45] Date of Patent: Aug. 31, 1993

[54] MAGNETIC DISC DRIVE MOTOR

[75] Inventors: Koichi Katakura; Kimio Kitajima, both of Komagane, Japan

[73] Assignee: Sankyo Seiki Mfg. Co., Ltd., Nagano, Japan

[21] Appl. No.: 892,613

[22] Filed: May 29, 1992

Related U.S. Application Data

[63] Continuation of Ser. No. 638,755, Jan. 8, 1991, abandoned.

[30] Foreign Application Priority Data

Jan. 11, 1990 [JP] Japan .................. 2-1462[U]

[51] Int. Cl.⁵ .................. H02K 5/24; H02K 7/14
[52] U.S. Cl. .................. 310/51; 310/67 R; 310/43
[58] Field of Search .................. 310/43, 45, 67 R, 51, 310/91; 360/98.07, 99.04, 99.08

[56] References Cited

U.S. PATENT DOCUMENTS

| | | | |
|---|---|---|---|
| 1,688,891 | 10/1928 | Spreen | 310/51 |
| 3,483,407 | 12/1969 | Frohmuller et al. | 310/51 |
| 3,874,073 | 4/1975 | Dochterman | 310/43 |
| 4,647,803 | 3/1987 | von der Heide et al. | 310/67 R |
| 4,965,476 | 10/1990 | Lin | 310/51 |

Primary Examiner—Steven L. Stephan
Assistant Examiner—C. LaBalle
Attorney, Agent, or Firm—McAulay Fisher Nissen Goldberg & Kiel

[57] ABSTRACT

A magnetic disc drive motor comprises a hub for carrying magnetic discs on its outer periphery, a drive magnet rigidly fitted to the inner periphery of the hub, a stator core having a coil wound around it and juxtaposed with the drive magnet and a motor frame having a substantially cylindrical holder for rigidly holding the stator core, wherein the space between the stator core and the motor frame is filled with a resin material. A compact and simply configured magnetic disc drive motor can thus be realized, which is capable of rotating magnetic discs in a very stabilized manner.

4 Claims, 3 Drawing Sheets

MAGNETIC DISC DRIVE MOTOR

This application is a continuation of application Ser. No. 638,755, filed Jan. 8, 1991 now abandoned.

BACKGROUND OF THE INVENTION

1. Field of Invention

The present invention relates to a magnetic disc drive motor for rotationally driving magnetic discs carried on it.

2. Background Prior Art

Known magnetic disc drive motors to be used for magnetic disc memory devices normally have a configuration as described below.

As illustrated in FIG. 3, motor frame 1 is provided on its central area with a substantially cylindrical holder 2, which holder 2 rotatably holds in it a shaft 4 by way of ball bearings 3, 3. A hollow and cylindrical hub 5 is rigidly fitted to the shaft 4, the hub 5 carries a number of magnetic discs 6 on its outer periphery arranged in rows and rigidly fitted thereto. The hub 5 also carries a drive magnet 7 on its inner periphery rigidly fitted thereto.

On the other hand, the holder 2 carries, on its outer periphery, a stator core 8 rigidly fitted thereto and surrounded by a coil 9 wound around it. The coil 9 and the drive magnet 7 are arranged in juxtaposition. The hub 5 and, therefore, the magnetic discs 6 on it are rotated when the coil 9 is energized.

A magnetic disc drive motor having a configuration as described above is required to be manufactured to provide high precision in terms of revolving oscillation and external vibrations. Furthermore, vibration of the motor itself should be minimized. Any vibration caused by the rotation of the motor can result in unreproducible oscillation of the magnetic disc that hinders normal data reading operation.

Conventionally, the problem of vibration is eliminated by providing a motor frame 1 having a thickness greater than a threshold value in order to enhance the rigidity of the motor frame 1 in order to minimize generation of unreproducible oscillation. If the motor frame 1 has a low rigidity, generation of unreproducible oscillation will be remarkable as the motor frame 1 and the ball bearings 3 can exhibit resonated vibration.

The demand for reduction of size and thickness observed in recent years, however, makes it difficult to realize a motor frame 1 having a large frame thickness within the very limited space allowed for providing a miniaturized memory device. Furthermore, the use of a highly rigid material for the motor frame 1 can considerably raise the overall cost of such a device.

Therefore, it is an object of the present invention to provide a small magnetic disc drive motor having a simple configuration and a highly rigid motor frame that provides a stable rotary drive operation of magnetic discs.

SUMMARY OF THE INVENTION

According to the invention, the above object is achieved by providing a magnetic disc drive motor comprising a hub for carrying magnetic discs on its outer periphery, a drive magnet rigidly fitted to the inner periphery of the hub, a stator core provided with a coil wound around it and juxtaposed with the drive magnet and a motor frame having a substantially cylindrical holder for rigidly holding the stator core, wherein the space between the stator core and the motor frame is filled with a resin material.

With such an arrangement, since the space between the stator core and the motor frame, which was not used for any particular purpose, is filled with a resin material, the space within the motor is effectively utilized to enhance the rigidity of the motor frame. In other words, the rigidity of the motor frame is increased without increasing its thickness so as to raise the frequency area of the vibrations generated within the device to such a level that they are not harmful to the operation of the device and, at the same time, acceleration of the vibration is reduced by the vibration damping effect of the resin material in order to minimize the noise level and the level of unreproducible oscillation.

For a better understanding of the present invention, reference is made to the following description and accompanying drawings while the scope of the invention will be pointed out in the appended claims.

DETAILED DESCRIPTION OF THE INVENTION

Figure 1:
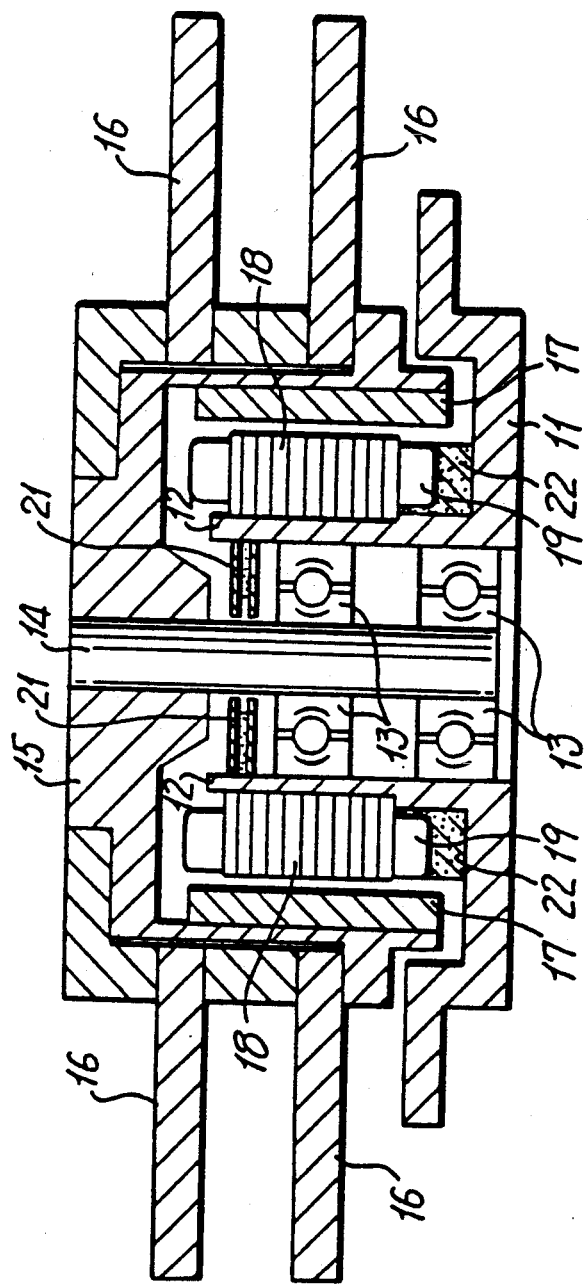
FIG. 1 is a longitudinal sectional view of a first embodiment of the magnetic disc drive motor of the invention.

In FIG. 1, which illustrates in longitudinal cross section a preferred embodiment of the invention, a hollow and cylindrical holder 12 is projecting upward from the central area of motor frame 11 and a shaft 14 is rotatably held in the holder 12 by way of a pair of ball bearings 13, 13 which are mutually spaced apart in the axial direction. A hollow and cylindrical hub 15 is rigidly fitted to the top of the shaft 14, as seen in FIG. 1, in such a manner that the outer surface of the holder is surrounded by the inner peripheral wall of the cylindrical hub 15. A number of magnetic discs 16 arranged in vertical rows are rigidly fitted to the outer peripheral wall of the cylindrical hub 15 and a drive magnet 17 is rigidly fitted to the inner peripheral wall of the hub 15.

A stator core 18 is rigidly fitted to the outer periphery of the holder 12. A coil is arranged around each of the projecting polar sections of the stator core 18 and juxtaposed with the drive magnet 17. When the coil 19 is electrically energized, the hub 15 and, therefore, the magnetic discs 16 are driven to rotate.

A magnetic fluid seal 21 is arranged above the opening of the upper ball bearing 13 as seen in FIG. 1.

The space between the stator core 18 and the motor frame 11 is filled with a resin material 22. As shown in FIG. 1, the resin material 22 directly contacts the coil. The resin material is a very hard epoxy resin having a Shore between D50 and 100 which is injected into the base portion of the holder 12 when the stator core 18 and the motor frame 11 are molded so that these components form an integral part of the device.

Therefore, the space between the stator core 18 and the motor frame 11, which was originally a useless area of the device, will be filled with a resin material 22 to enhance the rigidity of the motor frame. In other words, the rigidity of the motor is increased without increasing the thickness of the motor frame 11. This is done to raise the frequency area of the vibrations generated within the device to such a level that they are not harmful to the operation of the device and, at the same time, acceleration of the vibration is reduced by the vibration damping effect of the resin material 22 in order to minimize the noise level and the level of unreproducible oscillation.

The resin material 22 may be an epoxy resin adhesive.

Figure 2:
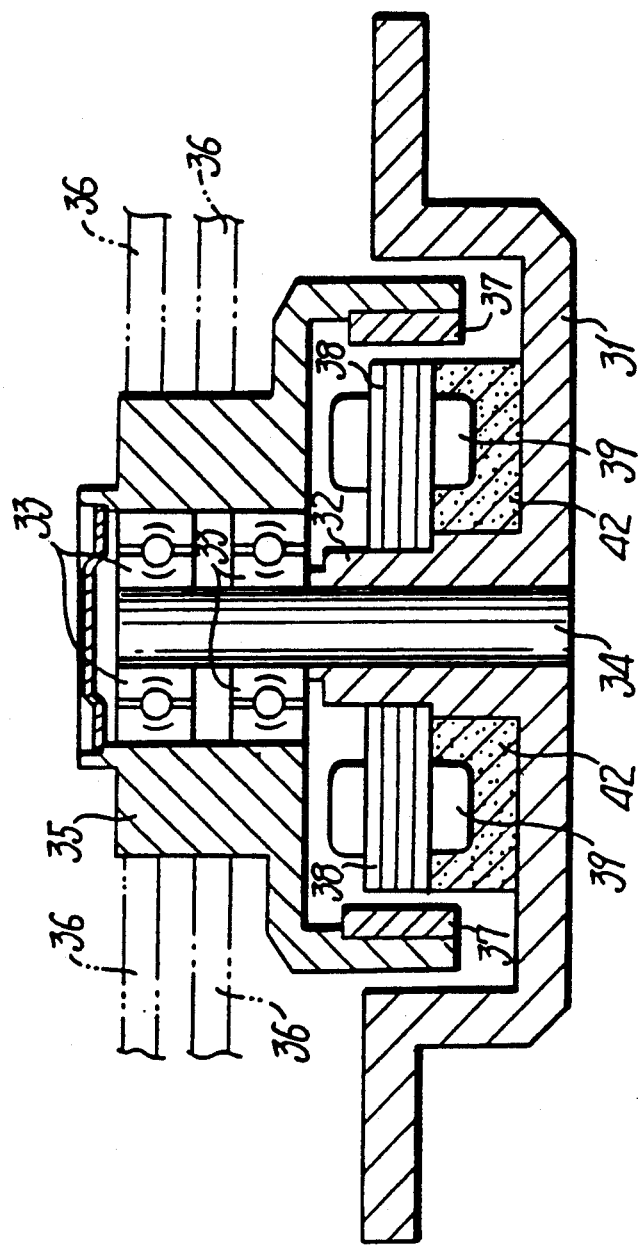
FIG. 2 is a longitudinal sectional view of a second embodiment of the invention.
Figure 3:
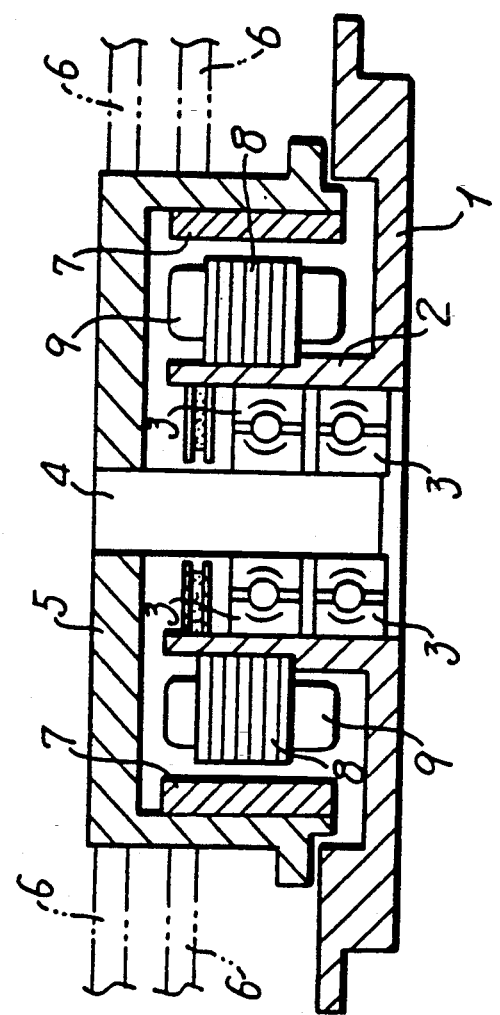
FIG. 3 is a longitudinal sectional view of a conventional magnetic disc drive motor.

The second embodiment illustrated in FIG. 2 is realized in the form of a fixed shaft type magnetic disc drive motor.

As illustrated in FIG. 2, a hollow and cylindrical holder 32 is projecting upward from the central area of motor frame 31 and a shaft 34 is coaxially held in the holder 32. The shaft 34 projects upwardly out of the holder 32 by a given length and a pair of ball bearings 33, 33 are fitted to the projecting portion of the shaft 34. The ball bearings are spaced apart from each other. A hollow and cylindrical hub 35 is rotatably supported by the shaft 34 by way of the ball bearings 33, 33. A number of magnetic discs 36 are arranged in vertical rows on the outer peripheral wall of the cylindrical hub 35. A drive magnet 37 is rigidly fitted to the inner peripheral wall of a skirt section having a large diameter and forming a lower portion of the hub 35 as seen in FIG. 2.

A stator core 38 is rigidly fitted to the outer periphery of the holder 32 and a coil 39 is wound around each of the projecting polar sections of the stator core 38. The coil 39 and the drive magnet 37 are arranged in juxtaposition so that the hub 35 and therefore the magnetic discs 36 are driven to rotate when the coil is electrically energized.

The space between the stator core 38 and the motor frame 31 is filled with a resin material 42. Also, in this embodiment, the resin material 42 directly contacts the coil. The resin material is a very hard epoxy resin having a Shore hardness between D50 and 100 as in the first embodiment and is injected into the base portion of the holder 32 when the stator core 38 and the motor frame 31 are molded so that these components form an integral part of the device. Alternatively, the resin material 32 may be an epoxy resin adhesive. Such resins and resin adhesives for use in both embodiments are known.

Therefore, in this second embodiment, as in the first embodiment, the space between the stator core 18 and the motor frame 31, which was originally a useless area of the device, is filled with a resin material 42 in order to enhance the rigidity of the motor frame. Moreover, the frequency range of the vibrations generated within the device is raised to such a degree that they are not harmful to the operation of the device and, at the same time, acceleration of the vibration is reduced by the vibration damping effect of the resin material 42 in order to minimize the noise level and the level of unreproducible oscillation.

As is apparent from the above description, since the space between the stator core and the motor frame, which was not previously used for any particular purpose, is filled with a resin material, the space within the motor is effectively utilized to enhance the rigidity of the motor frame. In other words, the rigidity of the motor frame is increased without increasing its thickness so as to raise the frequency of the vibrations generated within the device to such a degree that they are not harmful to the operation of the device and, at the same time, acceleration of the vibration is reduced by the vibration damping effect of the resin material in order to minimize the noise level and the level of unreproducible oscillation.

Therefore, a magnetic disc drive motor according to the invention can be provided which is compact and simple and is capable of driving magnetic discs for rotating them in a very stabilized manner.

While the foregoing description and drawings represent the preferred embodiments of the present invention, it will be obvious to those skilled in the art that various changes and modifications may be made therein without departing from the true spirit and scope of the present invention.

What is claimed is:

1. A magnetic disc drive motor comprises: a hub for carrying magnetic discs on its outer periphery; a drive magnet rigidly fitted to the inner periphery of said hub; a stator core provided with a coil wound around it and juxtaposed with said drive magnet; a motor frame having a substantially cylindrical holder for rigidly holding said stator core, said frame and stator core defining a space therebetween, which space is perpendicular to the axis of said cylindrical holder,; and a resin material filling the space between said stator core and said motor frame; said resin material being in direct contact with said coil, and said frame for providing vibration reduction for said motor.

2. The drive motor of claim 1 wherein said resin is a very hard epoxy resin.

3. The drive motor of claim 2 wherein said resin has a Shore hardness between D50 and 100.

4. The drive motor of claim 1 wherein the amount of resin filling the space between the stator and motor is sufficient to raise the frequency of vibrations in that portion of the motor so as to avoid deleterious vibration effects on motor operation and to reduce unreproducible oscillation without increasing the motor frame thickness.

* * * * *